United States Patent [19]
Pickenhahn

[11] Patent Number: 5,096,269
[45] Date of Patent: Mar. 17, 1992

[54] ANTILOCK BRAKE SYSTEM

[75] Inventor: Josef Pickenhahn, Plaidt, Fed. Rep. of Germany

[73] Assignee: Lucas Industries public limited company, Birmingham, England

[21] Appl. No.: 536,599

[22] PCT Filed: Nov. 9, 1989

[86] PCT No.: PCT/EP89/01339
§ 371 Date: Jul. 6, 1990
§ 102(e) Date: Jul. 6, 1990

[87] PCT Pub. No.: WO90/05657
PCT Pub. Date: May 31, 1990

[30] Foreign Application Priority Data
Nov. 14, 1988 [DE] Fed. Rep. of Germany ....... 3838571

[51] Int. Cl.[5] .................................................. B60T 8/50
[52] U.S. Cl. .......................... 303/115 PP; 303/DIG. 5; 303/DIG. 6
[58] Field of Search ............... 303/113, 114, 115, 119, 303/115 PP, 113 R, DIG. 5, DIG. 6

[56] References Cited
U.S. PATENT DOCUMENTS

| | | | |
|---|---|---|---|
| 4,099,793 | 7/1978 | Iio | 303/116 |
| 4,116,495 | 9/1978 | Belart | 303/115 |
| 4,752,104 | 6/1988 | Miyake | 303/114 |
| 4,765,692 | 8/1988 | Miyake | 303/119 |
| 4,941,712 | 7/1990 | Hirobe | 303/119 X |
| 4,957,330 | 9/1990 | Morikawa et al. | 303/115 |
| 4,988,148 | 1/1991 | Farr et al. | 303/113 |

FOREIGN PATENT DOCUMENTS

| | | |
|---|---|---|
| 171901 | 2/1986 | European Pat. Off. . |
| 3342555 | 6/1985 | Fed. Rep. of Germany ...... 303/115 |
| 0091353 | 4/1987 | Japan .................... 303/113 |
| 282158 | 5/1987 | Japan . |
| 078862 | 8/1988 | Japan . |

Primary Examiner—Matthew C. Graham
Attorney, Agent, or Firm—Oblon, Spivak, McClelland, Maier & Neustadt

[57] ABSTRACT

An antilock brake system comprises a valve (20) in the flow path of the hydraulic fluid between a master cylinder (10) and a brake cylinder (18). To obtain on braking without antilock control a rapid pressure buildup in the brake cylinder (18) and a throttled pressure buildup when braking with antilock control, a valve (20) is provided in the hydraulic connecting conduit (14, 14', 14") between the master and brake cylinders and comprises a floating piston (50) which is subjected on the one side to the pressure of the hydraulic fluid in the master cylinder (10) and on its other side to the pressure of the hydraulic fluid in the brake cylinder (18). The floating piston (50) controls the valve in such a manner that when the pressure in the master cylinder (10) is greater by a predetermined amount than the pressure in the brake cylinder (18) only a throttled flow through the valve (20) is possible. On braking without antilock control the valve (20) is open so that an unthrottled flow is possible from the master cylinder (10) to the brake cylinder (18).

4 Claims, 1 Drawing Sheet

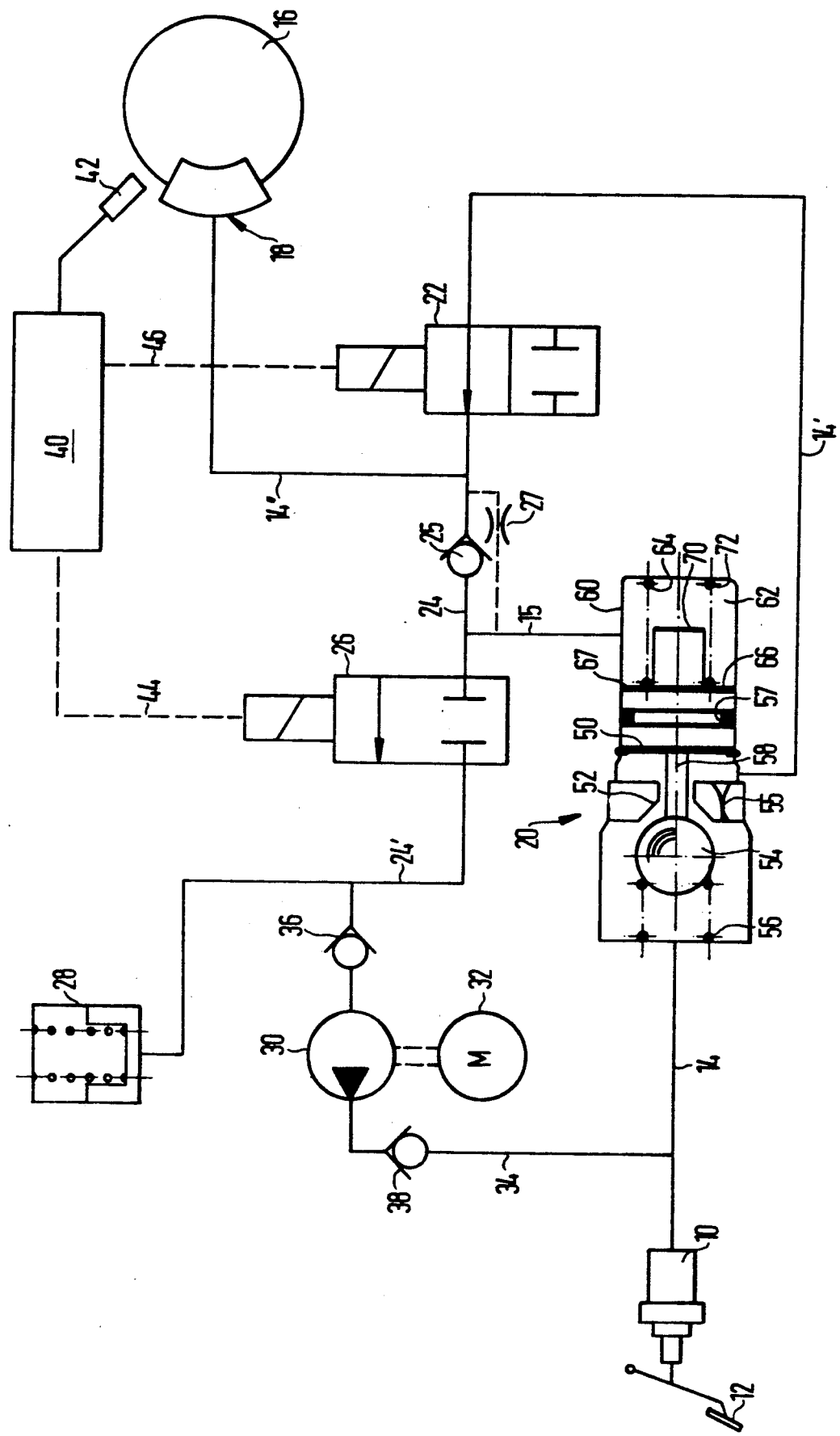

ANTILOCK BRAKE SYSTEM

The invention relates to an antilock brake system comprising a master cylinder in which a hydraulic fluid can be subjected to pressure, a connecting conduit between the master cylinder and a brake cylinder at the brake of an antilock brakable wheel, and a vent valve which is arranged in a further connecting conduit between the brake cylinder and a reservoir for hydraulic fluid and opens in an antilock control operation for reducing the pressure of the hydraulic fluid in the brake cylinder.

The structure and function of such antilock systems for four-wheeled and two-wheeled vehicles are known to the person skilled in the art. In them, the rotational behaviour of the wheels is continuously monitored by means of sensors and when the slip and/or the angular deceleration of the wheel exceeds a predetermined threshold value and thus indicates a danger of the wheel locking the normally open shutoff valve between the master cylinder and the brake cylinder is closed and the vent valve opened so that momentarily the pressure of the hydraulic fluid in the brake cylinder can be reduced to accelerate the wheel again into a favourable range of the friction coefficient-slip curve.

On starting a braking, i.e. when the driver via the brake pedal increases the pressure of the hydraulic fluid in the master cylinder, a pressure buildup as far as possible without delay is desirable in the brake cylinder to ensure that immediately on brake actuation a brake action also starts. For this purpose, the flow resistance in the hydraulic connecting line between the master cylinder and the brake cylinder must be as small as possible.

In an antilock control, that is a braking with pressure increases and pressure reductions following each other at very small time intervals in the brake cylinder, it is in contrast desirable to increase the pressure in the brake cylinder in retarded manner. A too rapid buildup of the pressure, i.e. a pressure buildup with too steep a time gradient, has among others the disadvantage that during an antilock control operation the pressure in the brake cylinder oscillates upwardly and downwardly about the optimum pressure value with excessive deviations, thus impairing the control and finally wasting braking distance. In contrast, with a throttled pressure buildup in the brake cylinder it is possible in an antilock control to adapt the profile of the brake pressure in optimum manner to the desired curve profile without the undesired "overshoot".

Antilock brake systems are already known in which an antilock control of a change of the pressure buildup gradient takes place. For this purpose, however, in the prior art complicated and/or trouble-prone means are proposed.

The invention is based on the problem of further developing an antilock brake system of the type mentioned at the beginning in such a manner that in simple economic and reliable manner on braking with antilock control a throttled pressure buildup takes place whilst on braking without antilock control a rapid unthrottled pressure buildup at the brake cylinder is possible.

According to the invention this problem is solved in that in the connecting conduit between the master cylinder and the brake cylinder a valve is arranged which in an antilock control operation has a larger flow resistance for the hydraulic fluid than in a braking without antilock control.

An advantageous further development of the invention provides that the valve generating a different flow resistance functions in purely mechanical manner. For this purpose, it comprises a floating piston which is subjected on one side to pressure of the hydraulic fluid in the master cylinder and on the other side to the pressure of the hydraulic fluid in the brake cylinder. The floating piston is arranged displaceably in the valve and the pressure of the hydraulic fluid in the master cylinder, if it is large enough, can cause a valve body to be pressed against a valve seat, the flow resistance for the hydraulic fluid between the master cylinder and the brake cylinder thereby being increased.

This solution according to the invention of the aforementioned problem is based on the recognition that the ratio of the pressures of the hydraulic fluid in the master cylinder and in the brake cylinder differs depending on whether a "normal braking" (that is a braking without antilock control) or a braking with antilock control is carried out. In an antilock control operation of course pressure is vented at the brake cylinder so that the ratio of the hydraulic pressure in the master cylinder to the pressure in the brake cylinder is greater than without antilock control. In the configuration described above of the valve according to the invention having a floating piston subjected to pressure on both sides the change of the pressure ratio between master and brake cylinders in an antilock control of the operation compared with a braking without antilock control is utilized in order by means of the floating piston to close a valve at least partially so that in an antilock control operation the flow cross-section in the valve is reduced and thus the flow resistance increased.

Compared with a likewise conceivable solution using an electronic control (in which a valve is subjected to a constrained electromagnetic control when a wheel exhibits a tendency to lock) this purely mechanical solution has the advantage of lower costs and higher functional reliability.

In a preferred embodiment of the brake system according to the invention it is provided that in a connecting conduit between the brake cylinder and the cylinder of the valve a check valve is provided. Preferably, the check valve has a throttled bypass, i.e. the flow path between the check valve is permanently bridged by a throttled shunt. This bypass has the advantage that changes of the valve state take place gently and not abruptly, which might irritate the driver. The check valve may however also leak to a defined extent, i.e. the valve seat may have a defined recess which is not sealed by the ball. This solution has the advantage that on every "normal brake" (without antilock control) this throttle point can be flushed clear and the throttle thus does not clog. The throttle may for example be formed as defined leak in the form of a triangular notch in the valve seat.

Hereinafter, an example of embodiment of the invention will be described in detail with the aid of the drawing.

BRIEF DESCRIPTION OF THE DRAWING

The FIGURE shows schematically an antilock brake system.

DETAILED DESCRIPTION

In a brake master cylinder 10 of known design the pressure of a hydraulic fluid is increased by means of a brake pedal 12 on braking.

A conduit 14, 14', 14" connects the master cylinder 10 to the brake cylinder 18 of an antilock brakable wheel 16.

In the flow path of the hydraulic fluid between the master cylinder 10 and the brake cylinder 18 a valve 20 according to the invention is arranged. Seen from the master cylinder 10, in the flow path behind the valve 20 a shutoff valve 22 known per se and required for an antilock control is disposed. The shutoff valve 22 is normally open and closes only during a pressure venting phase in the course of an antilock control in known manner.

A further hydraulic conduit 14", 24 leads from the brake cylinder 18 to a vent valve 26 likewise known per se. The vent valve 26 is normally closed and opens only in the course of an antilock control operation during a pressure reduction phase in which the shutoff valve 22 is closed These relationships are known to the person skilled in the art.

Furthermore, a hydraulic connecting conduit 14", 15 leads from the brake cylinder 18 to the valve 20. In this connecting conduit 14", 15, a check valve 25 is disposed.

In the hydraulic flow path between the brake cylinder 18 and the valve 20 the flow path through the check valve 25, which closes on overpressure on the side of the valve 20, is bridged by a throttled bypass 27.

A conduit 24' leads in known manner from the vent valve 26 to a reservoir 28 for hydraulic fluid. In likewise known manner, by means of a pump 30 hydraulic fluid is conveyed from the reservoir 28 via a conduit 34 up to the master cylinder 10. The pump 30 is operated by a motor 32. Before and after the pump 30 in the hydraulic conduit between the reservoir 28 and the master cylinder 10 a respective check valve 36 and 38 is disposed.

In known manner, an antilock control 40 receives from a sensor 42 measuring signals relating to the rotational behaviour of the wheel 16. Via electrical lines 44, 46 the control 40 controls inter alia the shutoff valve 22 and the vent valve 26.

The valve 20 comprises a floating piston 50 which is axially displaceable in a cylinder 60 of the valve. Connected to the floating piston 50 is a pushrod 58 which acts on a ball 54. From the side of the master cylinder 10 a spring 56 acts on the ball 54. Thus, the pressure of the hydraulic fluid in the master cylinder 10 acts on the floating piston 50 from the left in the FIGURE whilst from the right essentially the pressure in the brake cylinder 18 acts on the floating piston 50.

If the pressure difference acting on the floating piston 50, taking account of the force of the springs, is greater than a predetermined value the ball 54 is pressed out of the position shown in the FIGURE against a valve seat 52. In this position the flow cross-section for the hydraulic fluid from the master cylinder 10 via the conduit 14 to the conduit 14', i.e. to the brake cylinder 18, is greatly reduced. The reduction of the flow cross-section and thus increase of the flow resistance for the hydraulic fluid is defined by a throttle 55. Instead of the throttle 55 indicated schematically in the FIGURE a relatively narrow flow passage for the hydraulic fluid may also be formed in the valve seat 52.

The floating piston 50 moves in the cylinder 60 until it meets a stop 57. Arranged on the brake-cylinder side of the stop 57 is an axially displaceable piston 66 which is urged to the left by a spring 64 and defines a reservoir 62 for hydraulic fluid in the cylinder 60. The piston 66 carries a seal 67. Since the piston 66 is displaceable in the cylinder 60, the hydraulic pressure obtaining in the reservoir 62 and corresponding to that in the brake cylinder 18 is transmitted directly to the side of the floating piston 50 facing it.

The function of the brake system described above is as follows:

When the driver operates the brake pedal 12 the pressure in the hydraulic fluid in the master cylinder is increased. The pressure increase is transmitted unthrottled and practically without delay via the conduit 14, the valve 20, the conduit 14', the opened shutoff valve 22 and the conduit 14" to the brake cylinder 18. The valve 20 here is open, i.e. the ball 54 is in the position shown in the FIGURE in which it is remote from the valve seat 52.

When no antilock control is effected, i.e. the antilock control 40 does not generate any pressure reduction signal, the valve 20 remains open. The flow path between the master cylinder 10 and the brake cylinder 18 thus has a low flow resistance.

If however an antilock control operation is initiated, via the conduit 46 the antilock control 40 closes the shutoff valve 22. If the vent valve 26 is opened at the same time the pressure in the brake cylinder 18 diminishes whilst the pressure in the master cylinder 10 further retains its elevated value because the driver does not stop the braking. The pressure in the reservoir 62 also drops so that the floating piston 50 is pressed against the stop 57 and the ball 54 against the valve seat 52. The springs 56, 64 and the hydraulically effective areas are dimensioned so that the ball 54 remains in the closure position during antilock control operation. An increased flow resistance defined by the throttle 55 is thus now effective between the master cylinder 10 and the brake cylinder 18. If in the following control cycle for a pressure increase the vent valve 26 is closed by the control 40 and the control valve 22 opened, the throttled flow cross-section is effective and consequently the pressure buildup in the brake cylinder 18 is likewise throttled, in the desired manner.

The bypass 27 is not absolutely essential. If no bypass is provided the valve 20 reacts only on actuation of the pressure vent valve 26. In a pressure maintaining phase (valve 22 closes, valve 26 remains open), during an initial braking operation without subsequent pressure venting the valve 20 would remain open. On a subsequent reopening of the valve 22 a pronounced "overshoot" of the pressure could occur due to the pressure difference now obtaining between master cylinder 10 and brake cylinder 18. This overshoot also manifests itself acoustically and could therefore irritate the driver; furthermore, it has a negative influence on the quality of the antilock control The effect of the bypass 27 is that during an initial braking operation the pressure maintaining phase is no longer exactly present in the manner described above. However, such a pressure maintaining phase is then also no longer necessary. If during the initial braking operation itself "overshoot" of the pressure should already occur (which is certainly possible because the brake pressure buildup takes place completely unthrottled), the bypass throttle 27 does not play any part because the valves 22 and 26 are actuated practically simultaneously.

If however the valve 22 is closed (to maintain the pressure) because for example unevenness of the road surface influences the wheel velocity variation, by displacement of the piston 66 and reduction of the reservoir 62 via the throttle 27 the pressure in the wheel cylinder 18 is increased until the piston 66 strikes with a projection 70 secured thereon against the bottom 71 of the cylinder 60. The bypass throttle 27 is designed so that it allows only a relatively slow pressure increase, for example 100 bar/sec

I claim:

1. Antilock brake system comprising a brake cylinder (10) for a brake of an antilock brakable wheel (16) a master cylinder (10) for delivering hydraulic fluid under pressure to said cylinder (10), a connecting conduit (14, 14', 14") between said master cylinder (10) and said brake cylinder (18), a vent valve (26) in a further connecting conduit (24,24') between said brake cylinder (18) and a reservoir (28) for hydraulic fluid and which opens in an antilock control operation for reducing the pressure of hydraulic fluid in said brake cylinder (18), a purely mechanically operated valve (20) in said connecting conduit (14, 14', 14") between said master cylinder (10) and said brake cylinder (18), said valve (20) comprising a floating piston (50), means for subjecting said piston on its opposing sides during an antilock control operation to a pressure difference to move said piston into a position in which said valve (50) partially closes and thereby reduces flow of hydraulic fluid in said connecting conduit (14, 14', 14") between said master cylinder (10) and said brake cylinder (18), and a check valve (25) arranged in yet a further connecting conduit (14", 15) between said brake cylinder (18) and said purely mechanically operated valve (20) and which closes in response to flow of hydraulic fluid in a direction towards said brake cylinder (18).

2. Brake system according to claim 1, wherein said check valve (25) has a throttled by-pass (27).

3. Brake system according to either of claims 1 or 2, wherein said check valve (25) is arranged in a flow path (14", 24, 24') from said brake cylinder (18) to said reservoir (28) and between said brake cylinder (18) and said vent valve (26).

4. Brake system according to either of claims 1 or 6, wherein said floating piston (50) of said purely mechanically operated valve (20) is displaceable in a cylinder (60) and is subjected on one side to the pressure of hydraulic fluid in said master cylinder (10) and on the other side to the pressure of hydraulic fluid in said brake cylinder (18), and said connecting conduit (14", 15) between said brake cylinder (18) and said valve (20) leads into said cylinder (60) of said valve (20) for applying brake cylinder pressure to said other side of said floating piston.

* * * * *